United States Patent [19]
Lee

[11] Patent Number: 5,259,952
[45] Date of Patent: Nov. 9, 1993

[54] SYSTEM FOR SEPARATING SOLIDS FROM A LIQUID IN A DIVIDED CHANNEL

[75] Inventor: Charles A. Lee, Knoxville, Tenn.

[73] Assignee: Cer-Wat, Inc., Knoxville, Tenn.

[21] Appl. No.: 937,512

[22] Filed: Aug. 28, 1992

[51] Int. Cl.$^5$ .............................................. B01D 33/82
[52] U.S. Cl. ................................... 210/137; 210/391; 210/406; 210/416.1; 210/770
[58] Field of Search ............... 210/110, 134, 137, 154, 210/159, 160, 387, 391, 400, 401, 406, 407, 416.1, 770, 158, 359

[56] References Cited

U.S. PATENT DOCUMENTS

| | | | |
|---|---|---|---|
| 2,756,649 | 7/1956 | Lee | 162/348 |
| 3,150,037 | 9/1964 | Lee | 162/208 |
| 3,214,326 | 10/1965 | Lee | 162/205 |
| 3,224,928 | 12/1965 | Lee et al. | 162/214 |
| 3,645,842 | 2/1972 | Ward | 162/303 |
| 4,096,060 | 6/1978 | Lee et al. | 210/650 |
| 4,137,159 | 1/1979 | Sawyer | 210/19 |
| 4,137,169 | 1/1979 | El-Hindi | 210/406 |
| 4,285,816 | 8/1981 | Lee | 210/401 |
| 5,008,007 | 4/1991 | Anderson | 210/406 |
| 5,041,222 | 8/1991 | O'Dell | 210/406 |

FOREIGN PATENT DOCUMENTS 557356 5/1958 Canada .

Primary Examiner—Joseph W. Drodge
Attorney, Agent, or Firm—Luedeka, Hodges, Neely & Graham

[57] ABSTRACT

System for separating solids from slurry containing a separable solid in a liquid carrier, such as an industrial waste. The slurry is flowed into a separation chamber positioned over a slower moving foraminous medium to effect cross-flow separation of liquid from the slurry in an initial stage and followed by separation of solids from the slurry in a second stage all the separation being effected employing a single forwardly moving filtration medium. The flow rate of liquid, the rate of travel of the foraminous medium, and the differential pressure across the foraminous medium, as established by the pressure exerted by the flowing liquid on the foraminous medium and the relative pressure underneath the foraminous medium, are controlled at different locations along the length of the separation chamber to provide optimum steady-state separation for a given waste stream.

9 Claims, 3 Drawing Sheets

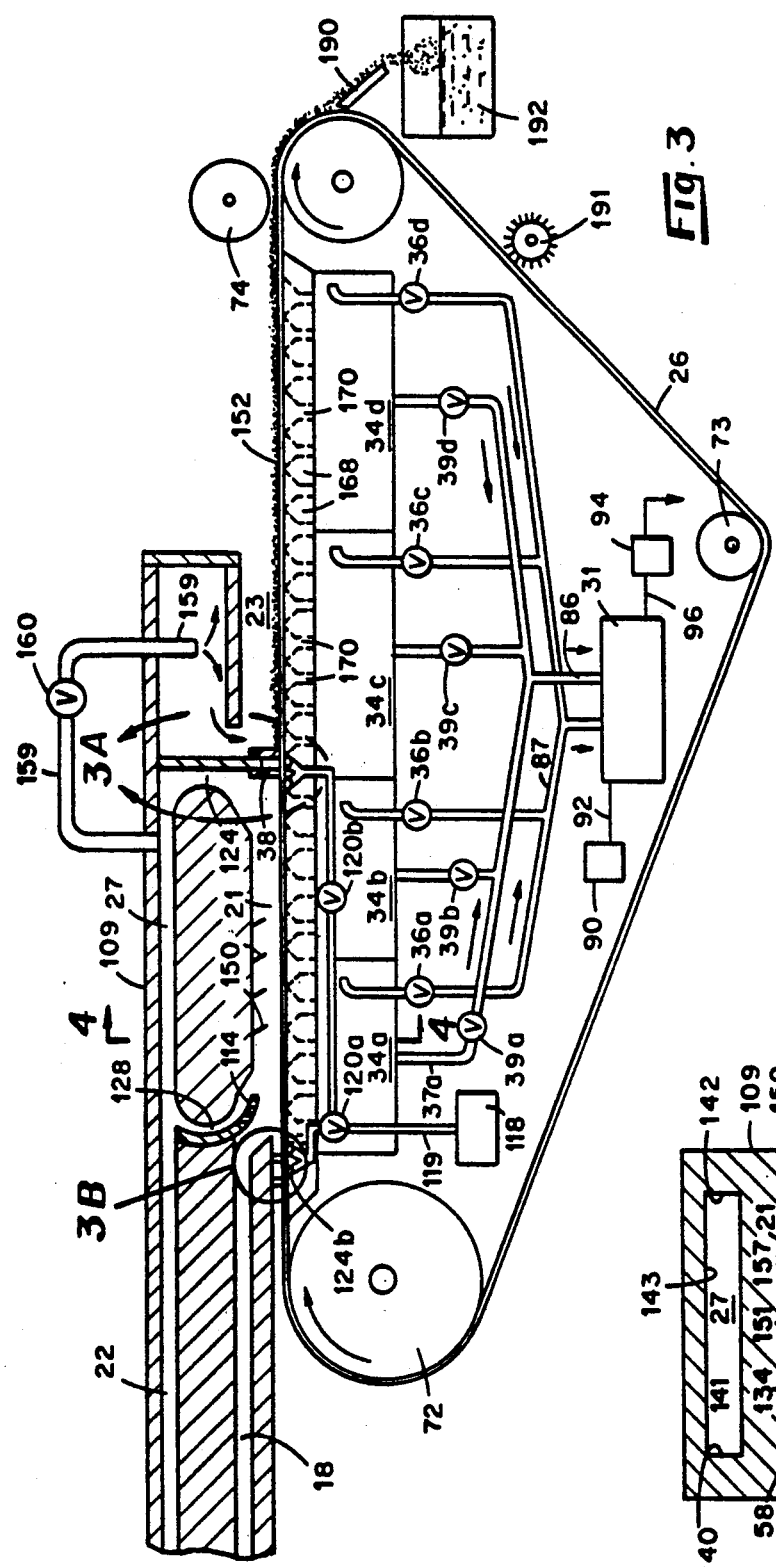
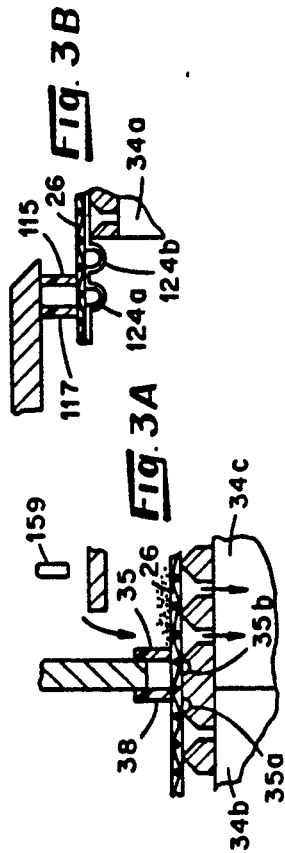
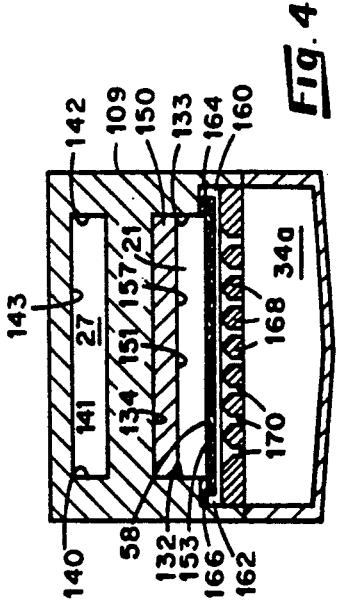

SYSTEM FOR SEPARATING SOLIDS FROM A LIQUID IN A DIVIDED CHANNEL

The present invention relates to systems for separation of solids from liquids and particularly to a cross-flow liquid/solid separation system for treating a slurry to isolate solids and liquids for collection.

Industry generates vast amounts of unsewerable waste streams each year which contain components which must be removed before disposal. These components often have value for sale or reuse. For example, in the coal industry, waste waters often contain significant amounts of coal fines. Removal of the fines from the water is difficult and expensive because of the small particulate size of the fines and because the fines have ionic forces which cause them to adhere to the water molecules. It is desirable to remove the coal fines from the water because environmental regulations prohibit the disposal of such waste streams without proper pretreatment. In addition, the recovered fines, and the water which is substantially free of the fines, are valuable for reuse.

In a typical prior art filtration process, a liquid having solids suspended therein is disposed on a filtration medium whereupon the liquid preferentially flows through the pores of the filtration medium, leaving a portion of the solids deposited as a layer on the surface of the medium. In this conventional filtration process, the pores through the filtration medium commonly define elongated tortuous pathways through the thickness of the filtration medium. The mechanism of filtration then becomes one of entrapment of the solid particulates within the pores and consequential buildup of a layer of solids on one surface of the medium. As is well recognized in the art, this mode of filtration results in the passage of substantial quantities of fine (small) solid particulates to escape through the filtration medium with the liquid so that frequently the filtrate containing the solids must again be processed to clarify the filtrate. These fines and other small solid particles so clog the filtration medium as to require close attention to cleaning of the filtration medium in order to maintain a reasonable continuous system of filtration. Even so, the system is greatly limited to throughput, size of particulates which may be separated, rate of separation, etc.

Other prior art filtration methods utilize other mechanisms. For example, in one prior art method for separating coal fines from water, a cationic polymer is added to the waste stream and the waste stream is initially fed through a centrifuge. The fines exiting the centrifuge are fed to a belt filter press to further dewater the fines. This method desires improvement, however, because it is essentially a batch process and the water effluent from the centrifuge contains a relatively high solids content and often requires substantial additional clarification.

In the present invention, it is anticipated that the solids to be separated from the liquid may not necessarily be suspended in the liquid as is normally the situation with waste water streams, for example. But rather, the solids may be molecular and of a molecular size that is larger than the molecular size of the liquid. The solid, therefore may be the solute in a solution. In the present application, the term "slurry" has been chosen to identify both suspensions of solids in a liquid and solutions which contain filtrable molecules, i.e., any flowable liquid which contains a separable component capable of being captured by the disclosed filtration medium and employing the disclosed filtration system and therefore being separable from the liquid.

It is therefore an object of the present invention to provide an improved system for mechanically isolating liquid and solid (which term includes separable molecular moieties) components of a slurry.

It is another object of the present invention to provide a continuous system for separating solids from a slurry.

It is a further object of the present invention to provide a system which separates liquids from a slurry under conditions of cross-flow filtration.

Accordingly, the present invention provides a system for separating the liquid and solids from a slurry wherein improved separation is achieved in a continuous operation without the need for additives or substantial post-treatment clarification. In accordance with the present invention, the desired separation of the liquid carrier and the solids from the slurry are effected in a separation channel which is divided into two sections that are disposed in tandem. The bottom wall of the separation channel comprises a forwardly moving filtration medium which has pores through the thickness thereof which preferably are of a size less than that which will permit the passage therethrough of the smallest anticipated solid particle contained within the slurry. Within the first section of the separation channel, the slurry is caused to flow over the surface of the filtration medium at a flow velocity that is greater than the rate of forward movement of the moving filtration medium, with the flow velocity of the slurry being sufficiently high as to create cross-flow filtration conditions in this first section. Under these conditions of slurry flow, the solids contained within the slurry are maintained suspended within the liquid carrier and are swept along with the slurry flow at a speed which prevents the solids from settling onto the filtration medium in the first section. Through the choice of pressurization of the slurry within the first compartment of the separation channel, or of the application of vacuum to the reverse surface of the filtration medium, or of a combination of pressurization and applied vacuum, liquid only is removed from the slurry within the first section. Because the solids within the slurry are prevented from entering or closing off the pores of the filtration medium within the first section, there is little, if any resistance to the withdrawal of liquid from the slurry within the first section and therefore the rate of liquid withdrawal has bee found to be phenomenally large. In the preferred embodiment, the slurry is recycled through the first section on a continuous basis, with addition and removal as will be explained hereinafter, so that the slurry becomes concentrated in solids.

A portion of the concentrated slurry is directed on a continuous basis from the first section to a second section. The same forwardly moving foraminous member defines the bottom wall of the second section as in the first section, the sections being separated by a flow restriction means. Within the second section, the conditions of slurry flow are altered to reduce the flow of the slurry to less than cross-flow conditions and the combination of the slurry flow rate and the application of vacuum to the reverse surface of the foraminous member is established within the second section to cause the solids to be deposited on the exposed surface of the foraminous medium in a filter cake layer. In the second section, the quantity of liquid associated with the slurry has been reduced by reason of the concentration activity within the first section so that the rate of liquid removal required in the second section is sufficiently low as permits this remaining liquid, or substantially all thereof, to be withdrawn from the slurry during the residence time of the slurry on the forwardly moving foraminous medium within the length of the second section.

In accordance with one aspect of the invention, leakage of the slurry from the upstream end of the first section is prevented by a first dam means interposed between the housing that defines the inlet to the first section of the separation chamber and the moving foraminous medium, to prevent backflow of the slurry along the exposed (upper) surface of the foraminous medium. Preferably this first dam means comprises two separated, but adjacent dams. A similar and second dam means is employed as a flow restriction means at the juncture between the first and second sections of the separation channel.

A further aspect of the invention includes the collection and removal of a controlled quantity of the liquid which is withdrawn from the slurry within the first section and which has progressed to the reverse surface of the foraminous medium adjacent to the first dam means. In accordance with this aspect of the invention, conduit means is provided at a location adjacent to, and on the downstream side of the first dam means and immediately beneath the reverse surface of the foraminous medium, and at a location adjacent to, and on the upstream side of the second dam means and immediately beneath the reverse surface of the foraminous medium so that regulated quantities of the withdrawn liquid may be quickly and immediately removed and carried away from these locations. To this end, the conduit means is connected to a vacuum source and provided with valve means interposed along its length to select and regulate the quantity of withdrawn liquid that is removed from each of these locations. By this means, there is prevented any accumulation of liquid at these two locations within the system as would prevent the desired continued flow of slurry within the sections and as would tend to create overburdening of the means for collection of the large quantity of liquid that is withdrawn rapidly from the slurry through the foraminous medium flowing through the first section. Further, this selective collection and removal of the withdrawn liquid at the respective ends of the first section aids in the prevention of leakage of liquid from the system at these locations. Thus, it will be recognized that the flow rate of the slurry, the rate of travel of the foraminous medium, and the differential pressure across the foraminous medium as developed by the pressure head exerted by the slurry on the foraminous medium and/or the vacuum applied to the underside of the foraminous medium, are controlled at different locations along the length of the separation channel to provide optimum steady-state separation for a given slurry or waste stream. If, as preferred, two dams in tandem are employed at the inlet end and the downstream end of the first section, two liquid collection conduits are provided at each of the dam locations.

In a preferred apparatus employed in the present invention, there is provided a source of slurry and means to convey the slurry under controlled conditions of flow, i.e. pressure and velocity, to a first closed separation channel. The separation channel is divided into first and second sections with the bottom wall of both sections being defined by a forwardly moving filtration medium, e.g. a foraminous continuous loop belt that is trained about suitable rolls (drive and idler) to cause the foraminous medium to move along an upper run that is located within, and which defines the bottom wall of the separation channel. Within the first section, the slurry is caused to flow first along the upper exposed surface of the foraminous medium, thence to be directed along a return channel to the upstream end of the first section where at least a substantial portion of the recycled slurry is caused to reenter the first section. Means are provided to selectively redirect a portion of the slurry from the return channel to the source of slurry. Generally stated, this portion is selected to aid in establishing constant flow conditions within the system, taking into account the nature of the slurry, the rate of withdrawal of liquid from the slurry within the first section (hence the concentration of the recycled slurry), the outflow of slurry from the first section to the second section, and the need for the addition of "fresh" slurry from the slurry source to achieve the desired flow conditions within the first section of the separation channel.

As noted above, a flow restriction means, e.g. a dam means, is provided as a separator between the first and second sections of the separation channel. By means of this dam means, the concentrated slurry is prevented from flowing from the first section, past the dam means and into the second section. A portion of the concentrated slurry flowing through the first section of the separation channel is withdrawn from this first section and conveyed to the second section where the concentrated slurry is deposited onto the forwardly moving foraminous medium, substantially at atmospheric pressure. The quantity of slurry withdrawn from the first section and conveyed to the second section is a function of several factors, including the nature of the slurry, the concentration of the slurry and the desired rate of filter cake buildup on the foraminous medium with the second section. Within the second section, the liquid is withdrawn from the slurry by means of vacuum applied to the reverse surface of the foraminous medium. Inasmuch as the second section is at atmospheric pressure, the present system provides the advantage of extending the length of the second section of the foraminous medium to accommodate attainment of steady-state continuous separation of the liquid and solids. On the order of 15% to 25% of the slurry recirculating within the first section may be caused to flow into the second section, but it is to be recognized that this percentage is variable and may vary either up or down as necessary to sustain the desired continuous operation of the system.

Liquid which is withdrawn from the slurry and which passes through the foraminous medium, is collected and carried away, as by means of a vacuum system. In a preferred embodiment, the vacuum system includes a vacuum box which is divided into compartments within each of which the vacuum may be controlled individually. By this means the application of suction to the reverse surface of the foraminous medium may be selected at various locations along the length of the upper run of the foraminous medium within the separation channel (optionally as well as during a portion of the upper run outside the channel at the downstream end thereof). This same vacuum system may be employed as a collection vessel to receive liquid separated from the slurry, whether or not suction is applied, to the reverse surface of the foraminous medium. Collected liquid may be directed to a source of reuse, or, because it is free of solids, may be sewered or directed to a naturally flowing stream. Control of the apparatus is effected as by microprocessor-controlled and activated valving as is well known in the art.

Whereas the preferred system is a closed system, in that the separation channel is designed to permit the pressurization o the slurry flowing through the channel, the present system may include an open system in which the slurry is flowed, at atmospheric pressure onto the forwardly moving foraminous medium at a flow velocity that is greater than the rate of forward movement of the foraminous medium such that cross-flow conditions are established and maintained within the first section of the foraminous medium. Further, it is to be recognized that whereas the preferred embodiment of the present invention involves the utilization of a substantial length of upper run of the foraminous medium in the first section, it is possible to develop and maintain cross-flow conditions within a very short distance at the upstream end of the foraminous medium by shortening the length of the separation channel and the return channel, hence shortening the recycle loop. Other variations of the system will be evident to one skilled in the art given the present disclosure.

In a typical operation of the system of the present invention, the flow rate of the slurry is controlled at a velocity sufficient to cause solids contained within the slurry to be swept along with the slurry as the slurry moves through the first section of the separation channel. In this manner, solids are prevented from entering or collecting to block the foramen of the foraminous medium. A differential pressure provided across the foraminous medium defined preferably by forces internally of a closed channel but which may, in certain applications, be defined by a combination of pressure and vacuum or vacuum alone, in the first section of the channel, causes liquid to pass out of the channel through the foraminous medium. Different separation forces are established within the second section of the channel, downstream of the first section, as by applying suction forces to the reverse side of the foraminous medium downstream of the first section. Further, a reduced volume of concentrated slurry is allowed to enter the second section. The suction forces, in combination with the altered flow of slurry, serve to reduce the cross-flow activity, cause liquid to pass through the medium, and additionally cause solids to be captured on the exposed upper surface of the foraminous medium. The deposited layer of solids is removed from the foraminous medium by gravity or mechanical action and collected. Contrary to the known prior art cross-flow filtration systems in which there is possible only mere concentration of the solids in the slurry, no actual accumulation of a filter cake, and the concentrated slurry must be collected and processed by a different system to achieve adequate liquid removal, in the present system, there is provided means whereby liquid is withdrawn and a filter cake is developed continuously under steady-state conditions as the slurry is circulated through the system. In the prior art cross-flow filtration systems, solids content of the system commonly does not exceed about 25% solids, with as much as 50% solids in the slurry being rare, due in large measure to the difficulty in pumping the viscous slurry. Thus, these prior art systems require holding tanks to receive and store the concentrated slurry, plus additional equipment and exposure to remove further water from the slurry. In the present system the filter cake at solids concentration exceeding 70% is removed continuously from the filtration medium.

Other objects, features and advantages of the present invention will become apparent upon reading the following detailed description and when considered in accordance with the appended claims and accompanying drawings, in which:

FIG. 3 is a sectional view of a separation channel suitable for use in the system of FIG. 2 (employing a slightly different path of movement of the foraminous medium); and FIG. 3A is an enlarged representation of means for dividing the separation channel along its length into an initial length portion and a second length portion, and is taken generally along the line 3A of FIG. 3;

FIG. 3B is an enlarged representation of means for preventing back-flow of slurry in the region of the inlet to the separation channel, and is taken generally along the line 3B of FIG. 3; and FIG. 4 is a cross-sectional view of the separation taken generally along the line 4—4 of FIG. 3.

Figure 1:
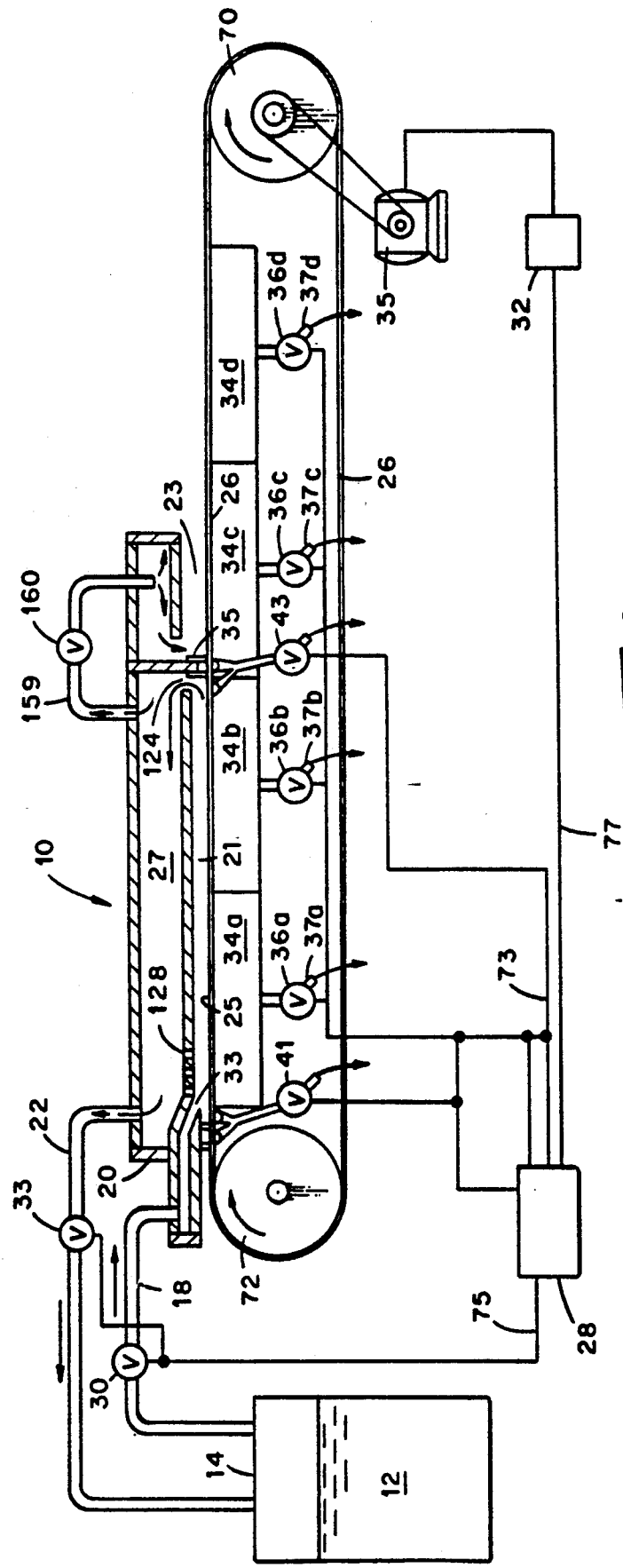
FIG. 1 is a schematic diagram of a separation system provided in accordance with the present invention.

With reference to the drawings, in which like reference characters refer to like parts, FIG. 1 shows a schematic diagram of a system 10 for separating solids from a slurry 12 which contains solids within a liquid carrier. The system 10 includes a source of the slurry, such as a tank 14, and a conduit 18 for delivering the slurry into a separation channel 20 for separation of solids. A conduit 22 is similarly provided for return of slurry to the tank. The separation channel 20 includes first and second sections 21 and 23, respectively, having a bottom wall 25 defined by a foraminous medium 26. The foraminous medium 26 is positioned underneath the separation channel for travel in the direction of the arrows as depicted in FIG. 1. Control system 28 controls the flow of the slurry, the line speed of the foraminous medium, and the differential pressure across the foraminous medium, as established by the pressure exerted by the flowing slurry on the foraminous medium and/or the relative pressure underneath the foraminous medium, to provide optimum separation conditions for a given slurry.

The flow rate of the slurry, for example, may be controlled by a valve 30 provided on the conduit 18 and operatively associated with the control system 28. The line speed of the foraminous medium may likewise be controlled, such as by a control switch 32 provided between the drive mechanism 35 of the foraminous medium and the control system. The differential pressure across the thickness of the foraminous medium in the first section is established by the pressure exerted by the flowing slurry on the foraminous medium, by the relative pressure underneath the foraminous medium, or by a combination thereof. The density of the slurry, the flow rate of the slurry, the pressure within the chamber, and the line speed of the foraminous medium primarily determine the pressure exerted by the slurry on the foraminous medium. In a "closed" system, the pressure within the chamber and the flow of slurry may be independently adjusted to provide optimum conditions for a given waste stream. Additionally, as will be explained more fully below, some slurry may be returned from the downstream end of the first section 21 to the tank or recirculated to the upstream end of the section 21. To this end, a return channel 27 is provided in fluid communication with the first section 21, a valve 33 is provided on the conduit 22, and a flow diverter 29 is provided in the channel 27 to control the return of slurry to the tank or to recycle a portion to the section 21. The relative pressure underneath the foraminous medium is adjusted by selectively applying a vacuum supplied from a source 31 to the underside of the foraminous medium. For example, a vacuum box comprising a series of individually controllable compartments 34a-34d may be provided underneath the foraminous medium. A series of valves 36a-36d in flow communication with the vacuum compartments and operatively associated with the control system allows selective application of suction forces underneath the foraminous medium. This same, or another similar, source of vacuum may be used to convey away liquid which is collected in the vacuum boxes through respective outlet conduits 37a-37d.

In a preferred operation, the system travels the slurry along the first section 21 of the channel 20 at a rate which is faster than the line speed of the foraminous medium and which is sufficient, in the absence of suction or other forces, to cause 10 solids contained within the slurry to be swept along with the slurry. These flow conditions favor the flow of liquid out of the chamber through the foraminous medium. In a preferred embodiment, no vacuum is applied to the underside of the foraminous medium through the first and second vacuum compartments 34a and 34b and cross-flow velocity of the slurry within the section 21 is established so that substantially only liquid is removed from the slurry in the region between the inlet 33 to the first section 21 and a flow restricting dam 35 which defines the separation of the first section 21 and the second section 23. Under these conditions, essentially no solids are deposited on the foraminous medium in this first section, but rather the solids are swept along the length of the section 21 and ar thereby prevented from depositing on the medium and/or from entering or blocking the foramen of the foraminous medium. This may be accomplished, for example by closing the valves which lead to the vacuum compartments 34a and 34b located beneath the first section 21 of the system. In the second section of the system downstream of the first section, between the dam 35 and the downstream end 39 of the separation channel, the relative pressure, i.e. vacuum, underneath the foraminous medium is controlled by opening the valve 34c such that liquid continues to flow through the foraminous medium but solids are encouraged to deposit on the foraminous medium. The withdrawal of further liquid from the solids which collect on the medium may be effected by opening the valve 36d to thereby develop suction within the compartment 34d.

In a preferred embodiment as depicted in FIG. 3, there is provided a flow impeding dam 35 positioned between the first and second sections 21 and 23 and depending downwardly from the top wall of the channel 20 and between the opposite side walls 132 and 134 thereof to a terminal location in contact with the foraminous medium 26 which defines the lower wall of the channel. This dam effectively serve to define the downstream end of the first section 21 of the separation channel and the upstream end of the second section 23 of the channel. In this manner, the first section provides a region wherein a significant amount of substantially solids-free liquid may be separated from the slurry to concentrate the slurry, and the second section provides a region wherein a substantial portion of solids may be deposited on the foraminous medium as a filter cake and thereby separated from the slurry while employing a single forwardly moving foraminous medium that preferably is a continuous loop belt.

Figure 2:
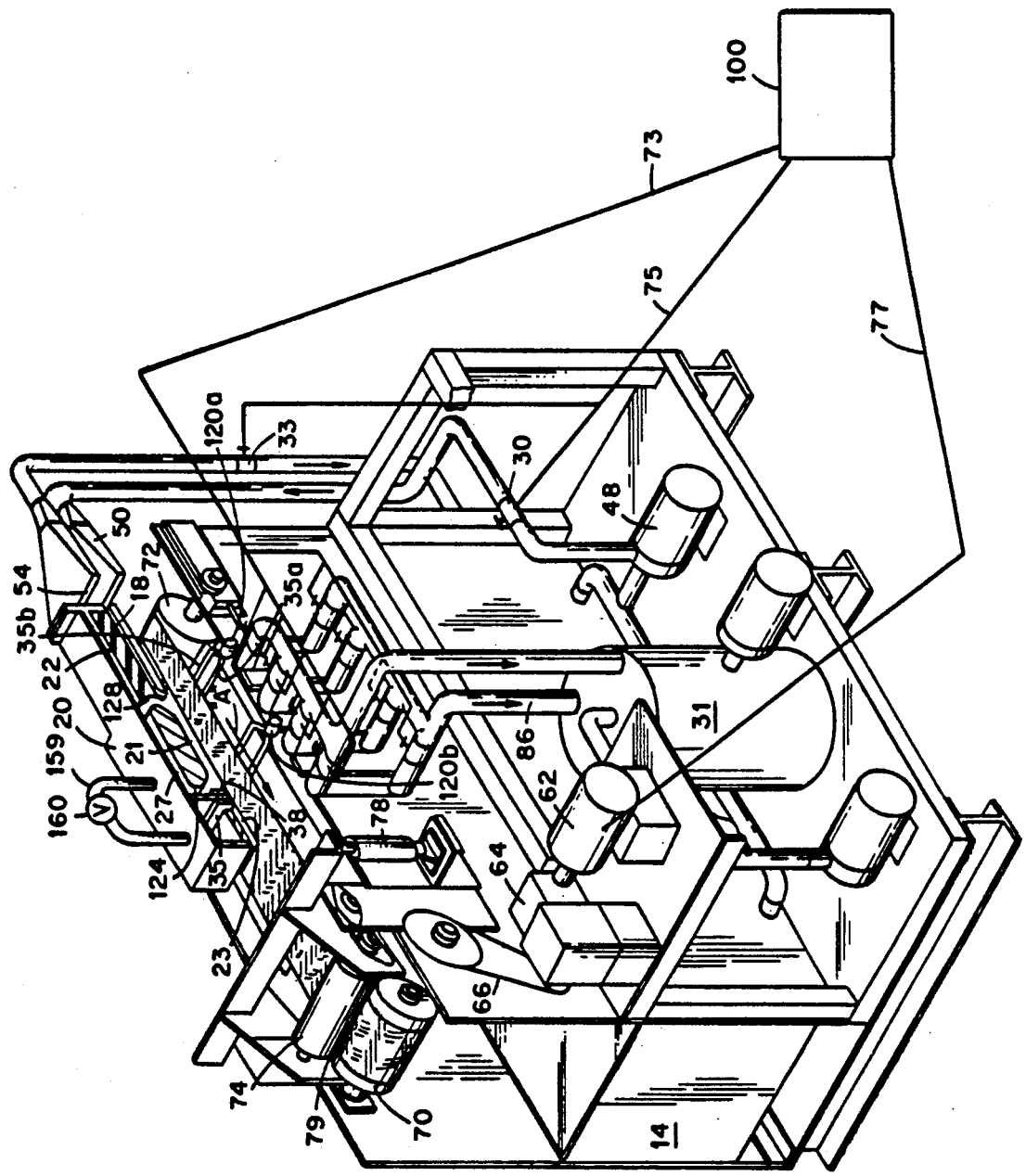
FIG. 2 is a schematic perspective view, partly exploded, of a system embodying various features of the present invention.

With reference to FIG. 2, there is shown further apparatus 38 for separating solids from slurry in accordance with the present invention. The apparatus includes a support stand 40, tank 14 which provides a source of the slurry, an elongate separation channel 20, and a foraminous medium 26 movably positioned beneath and in adjacent alignment with the separation channel for travel in the direction of the arrow A. In a preferred embodiment, the foraminous medium is in the form of an endless loop and is provided as described in copending U.S. patent application 07/937,365 entitled "Filtration Medium Including Substrate-supported Porous Membrane and Method for the Manufacture Thereof", and which is incorporated herein by reference.

Slurry is introduced from the tank 14 and into the separation channel 20 for separation of the liquid and solids and collection of the isolated slurry components. Unseparated slurry components may be returned to the tank or recirculated within the channel until the desired separation is complete. To introduce slurry from the tank 14 to the separation channel 20, an inlet conduit 18 and an in-line pump 48 are provided between the tank 14 and an inlet manifold 50 of the channel 20. An outlet conduit 22 is provided between the tank and an outlet manifold 54 of the channel for returning slurry to the tank 14, this return flow being regulated by valve 33.

The inlet manifold 50 routes the slurry into the separation channel for travel therealong at a flow rate (velocity) which is greater than the rate of forward travel of the foraminous medium. The incoming flow of slurry is directed into the first section 21 and toward a lower wall defined by the foraminous medium 26. The foraminous medium is trained about a drive roll 70, and a tensioning roll 72 (see FIG. 2) so as to be positioned for travel below and adjacent the separation channel and includes a drive assembly 60 includes an electric motor 62 and a gearbox 64 connected by a drive belt 66 to the drive roll 70. The drive roll 70 contacts the foraminous medium to maintain the direction of motion of the foraminous medium in the direction of the arrow "A" and at a selectable speed. The roll 71 and the tensioning roll 72 (FIG. 3) are provided to guide and stretch the foraminous medium. FIG. 3 depicts a slightly different path for the medium 26 and includes an idler roll 73. As will be explained further below, the pressure within the chamber, the flow rate of the slurry and the line speed of the medium are controlled by a control system 72 via various leads 73, 75 and 77 to accomplish separation of the liquid and solids. The solids are separated by deposition along a selected portion of the foraminous medium. A hydraulic press roll 74 is provided adjacent the downstream end of the separation chamber and actuable by means of a hydraulic piston-cylinder 73 to provide a nip 79 for further removal of liquid from the solids deposited on the foraminous medium.

With reference to FIGS. 1, 2 and 3, the apparatus further includes a vacuum box system comprising individually controlled compartments 34a-34d to provide selectable differential pressure across the thickness of the foraminous medium which favors the flow of liquid through the foraminous medium and which regulates the deposition of solids onto the foraminous medium and which serves to convey away the liquid which is withdrawn from the slurry through the foraminous medium. In this manner, a first differential pressure zone is provided along the first section 21 of the separation channel 20 wherein solids are discouraged from depositing on the foraminous medium by establishing and maintaining cross-flow conditions within this zone, and a second differential pressure zone is provided along the second section 23 wherein solids are encouraged to deposit onto the foraminous medium. In this example, the flow of liquid from the slurry through the medium is greatest in the first zone.

The depicted vacuum box system includes a plurality of vacuum compartments 36a, 36b, 36c and 36d positioned adjacent to and below the foraminous medium to support the foraminous medium and to selectively apply a negative pressure to discrete portions of the underside of the foraminous medium to withdraw liquid through the foraminous medium and to regulate the deposition of solids onto the foraminous medium from the flowing slurry. Liquid withdrawn by the vacuum compartments drains through a drain conduit 86 in flow communication with each vacuum compartment to a collection tank which may be the vacuum tank 31. With specific reference to FIG. 3, each of the vacuum compartments 34a-d is provided with a drain outlet conduit 37a-d, respectively. Solenoid-controlled valves 39a-d are interposed along the length of each of the drain conduits, respectively, for control of the drainage of liquid from each of the vacuum compartments, independently of the application of vacuum within each of these compartments. The drain conduits 37a-d are each connected to the drain conduit 86 which leads in fluid communication to the vacuum/collection tank 31. The depicted vacuum system also includes a pump 90 connected by a conduit 92 in flow communication with the vacuum tank 31 to develop a vacuum within the tank 31. As desired, one or more eductors may be used in lieu of the pump 90. As noted, valve assemblies 36a-d are interposed along the length of a conduit 87 for selectively applying a negative pressure to selected vacuum compartments. Liquid collected in the collection tank is drained for disposal or reuse or by a discharge pump 94 and discharge conduit 96 located at the drain end of the collection tank.

With continued reference to FIGS. 1 and 2, the control system includes a microprocessor 100 and a plurality of electrical leads 73, 75 and 77 extending from the microprocessor to various controlled devices. In the depicted embodiment, the lead 73 extends to valves 33, 36a-36d, 41 and 43, the lead 77 extends to a control switch 32 on the electric drive motor 35, and the lead 75 extends to the valves 30 and 33.

With reference now to FIGS. 1-3 and 4, there is shown a preferred embodiment of the separation channel 20 including a housing 109. In this embodiment, the separation channel includes an inlet conduit 18 in flow communication with the inlet end of the first section 21 for introducing slurry into the separation channel. As shown, a hemi-spherical shaped flow director 114 which extends fully across the width of the first section 21 is provided to direct slurry from the inlet conduit into the separation channel such that the flow of the slurry is generally downward and toward the lower wall of the channel which is defined by the foraminous medium. As depicted in FIG. 3B, a pair of flow restricting dams 115 and 117 is provided in the region between the flow director and the foraminous medium 26 to seal and prevent leakage of the slurry from the channel in this area. Liquid evacuation channels 124a and 124b are provided downstream of the dams 115 and 117, respectively. These channels extend fully across the width of the section 21 and are connected to a vacuum tank 118 by means of a conduit 119 (See FIG. 3). Valve means 120a interposed in the conduit 119 provides for control of the withdrawal of liquid via the channels 124a-b. By this means, there is prevented an accumulation of liquid adjacent these dams, thereby minimizing leakage of liquid therepast. In like manner, liquid collected in the channels 35a and 35b associated with the dams 35 and 38 is also conveyed to the tank 118 via the conduit 119. Further valve means 120b in the conduit 119 provides for control over the withdrawal of liquid from the channels 35a and 35b.

There is also provided a pair of flow impeding dams 35 and 38 positioned within the channel 20 and depending downwardly from the top wall of the channel and between the opposite side walls 132 and 134 thereof to a terminal location in contact with the upper surface 25 of the foraminous medium 26 which defines the lower wall 58 of the channel. These dams effectively prevent the flow of slurry from the first section 21 to the second section 23 while permitting the forward movement of the medium 26 therebeneath.

With further reference to FIGS. 1-3, upstream of the dams 35 and 38 there is provided a funnel shaped channel 124 located adjacent to and on the upstream side of the dams which connects the downstream end of the first section 21 of the separation channel to the recirculation channel 27. The depicted recirculation channel 27 is parallel to and spaced apart from the first section 21 separation channel for returning slurry to the tank or to the beginning, i.e. upstream end, of the separation channel. A connecting channel 128 having a selectably positionable flow diverter 29 connects the recirculation channel 27 to the first section 21 of the separation channel for recirculation of slurry to the beginning of the separation channel. A return conduit 22 in flow communication with the outlet manifold connects to the recirculation channel 27 for returning slurry to the tank 14. The position of the flow diverter 29 determines whether slurry is recirculated or returned to the tank or both.

Upstream of the location of the connecting channel 124 there is provided a liquid flow diversion conduit 159 into and through which slurry from the channel 27 may be withdrawn and directed into the upstream end of the second section 23. Control of the flow of the slurry through the conduit 159 is regulated by the valve 160.

With reference now to FIG. 4, the separation channel 20 depicted in FIG. 3 provides a flow path along the sections 21 and 27, each of which is of generally rectangular cross-section. The section 21 is defined on three sides by interior walls 132, 133, and 134. The foraminous medium defines the lower wall 58 of the section, as previously explained. In one embodiment, the side walls 132 and 133 of the section 21 may be spaced apart by about 6.5 inches, and the distance between the top wall 134 of this section and the bottom wall which is defined by the foraminous medium is about 2 inches. As shown in FIG. 4, the side edges of the foraminous medium are disposed within slots 160 and 162 defined in the bottom edges of the side walls 132 and 133 with an effective width of about 6.5 inches of the foraminous medium being exposed to the interior of the section 21. Appropriate seals 164 and 166 are provided within the slots 160 and 162 for sealing against slurry flowing from the section 21 around the side edges of the foraminous medium. The length of the first section 21 is selected to provide the desired withdrawal of liquid from the slurry over a selected time period—a function of the slurry.

In a preferred embodiment as depicted in FIG. 3, the foraminous medium is supported by means of a perforated plate 168 which serves as a top cover for the several vacuum compartments 34a–d. Liquid withdrawn from the slurry flowing through the extraction chamber flows through the perforations 170 in the plate 168, thence into the individual vacuum boxes. Drain conduits 37c–d provided for each vacuum compartment provides for removal of liquid therefrom.

The recirculation channel 27 is also of rectangular cross-section, and is defined by inner walls 140, 141, 142, and 143. The cross-sectional geometry of the channel 27 preferably is the same as that of the channel 20.

With continued reference to FIGS. 2 through 4, a plurality of uniformly spaced apart orifice blades 150 are shown positioned along and depending from the upper wall of the first section 21 of the channel 20. Each blade projects into the interior of the first section of the channel and in the depicted embodiment has a width equal to the width of the channel. As many of the orifice blades as required may be provided at uniformly spaced locations along the length of the interior of the first section 21 of the channel, to achieve the desired flow of the slurry. These blades terminate at their bottom edge 157 above the exposed inner surface 153 of the foraminous medium 26 a selected distance, e.g. about ½ inch, to define flow restricting orifices spaced along the path of the flowing slurry. These blades function in the nature of orifices and expand the flow of slurry therepast in the separation channel into a highly turbulent, pulsating flow such that the solids are maintained in suspension, thereby enhancing the desired flow of the slurry along the length of the channel. Notably, no blades are provided within the second section 23. Further as noted previously, preferably vacuum is applied to only the second section 23 of the channel. This combination results in deposition of solids onto the foraminous medium within only the second section of the channel. It is to be recognized that vacuum may be applied in the first zone or a combination of pressure and vacuum may be employed in this first zone, depending upon the desired separation effect.

Whereas there is depicted and described an inlet to the first section 21 of the separation channel 20 in which the incoming flow of slurry is diverted from the inlet conduit 18 downwardly onto the forwardly moving foraminous medium in the form of a "sheet" of flowing slurry that extends fully across the width of the inlet by means of a flow diverter, it is to be recognized that other types of inlet flow control devices may be employed. Such devices as are common in the papermaking industry may be employed and are variously known as headboxes and/or slices, or combinations of these. One such device is that type depicted in U.S. Pat. No. 2,756,649, which is incorporated herein by reference. In any event, the primary purpose of these inlet devices is to present the incoming slurry to the foraminous medium in a forwardly flowing stream that has a flow velocity which is sufficient to create cross-flow conditions with respect to the forwardly moving foraminous medium. In another aspect, the present invention may be an "open" system in which the slurry flowing over the foraminous medium in the first section is at atmospheric pressure. In this or any suitable system, it is of the essence of the invention that the flow of the slurry over the medium at the upstream end of the first section be such as develops cross-flow conditions in which the solids within the slurry are kept suspended within the slurry and are not allowed to accumulate in or on the foraminous medium. The length of the initial flow path of the slurry wherein it is under cross-flow conditions may range from a few inches up to any economical length. Separation efficiency may suffer when the shorter cross-flow lengths are employed, and longer cross-flow lengths tend to consume excessive energy for moving of the slurry. Where the slurry is flowed onto the foraminous medium under atmospheric pressure, but at high velocity, it may be required that the slurry be withdrawn at the downstream end of the first section as by a vacuum means or the like for recirculation to the source of slurry and/or to the upstream end of the first section. Further, in this mode of operation, vacuum preferably is applied to the reverse surface of the foraminous medium to aid in liquid withdrawal from the slurry.

As mentioned previously, the flow rate of the slurry the rate of travel of the foraminous medium, the pressure head exerted by the stream on the foraminous medium, and/or the vacuum applied to the underside of the foraminous medium are selected to provide optimum steady-state separation for a given slurry. To this end, it has been experienced that for a system having an extraction channel of the aforesaid construction and a slurry containing water and coal fines at a solids consistency of about 2 to 23%; the following parameters will result in removal of about 99+% of the solids from the slurry during a single pass of the slurry through the apparatus:

| Parameter | Value |
| --- | --- |
| Pressure head | 10 to 30 psi |
| Slurry flow rate through first section | 10 to 20 ft/sec |
| Line speed of filter belt | 1 to 10 ft/min |
| Vacuum | 3 to 24" Hg applied in second section |

As noted above, the vacuum is applied only within the second section 21. With reference to FIG. 3, the vacuum in the example is first applied to the foraminous medium in the region downstream of the dam 35. The vacuum is applied substantially uniformly to the underside of the foraminous medium by way of the vacuum compartments 34c and 34d. To this end, it will be understood that the vacuum compartments 34a and 34b upstream of the dam 35 preferably do not apply vacuum to the foraminous medium, but serve to support the foraminous medium and as receptacles to receive liquid which passes through the foraminous medium upstream of dam 35. As shown in FIG. 3, a filter cake 152 of solids is deposited onto the medium 26 commencing where vacuum is first applied via vacuum compartments 34c and 34d and continuing until the desired dryness of the solids is achieved. No material deposition of solids on the medium 26 occurs upstream of the dam 35. The cake 152 may be compressed by contact by the pressure roll 74 and finally removed from the medium 26 as by a doctor blade 190 and collected in a receptacle 192. A brush roll 191 is provided downstream of the roll 70 and in rotating contact with the medium 26 for cleaning any residual particulates from the medium.

As mentioned previously, the flow rate of the slurry and the line speed of the foraminous medium are controlled such that the slurry has a greater velocity than the surface speed of the foraminous medium. This causes the slurry to be maintained in cross-flow conditions within the first section of the channel whereby the solids are maintained in suspension and swept along with the flow of the slurry in this first section 21. This flow environment results in "cross flow" filtration, wherein only essentially solids-free liquid is extracted from the slurry and permitted to enter and pass through the foramen of the foraminous medium in the first section 21. The pressure head of the slurry forces the essentially solids-free liquid through the foraminous medium for removal from the separation channel. It will therefore be understood that it is desirable to restrict deposition of solids onto the foraminous medium for a sufficient length of the extraction channel such that a large percentage of liquid may be removed from the slurry before deposition of the solids is carried out in the second section 23.

The foregoing description of certain embodiments of the present invention has been provided for purposes of illustration only, and it is understood that numerous modifications or alterations may be made without departing from the spirit and scope of the invention as defined in the following claims.

What is claimed is:

1. A system for separating liquid and solids from a slurry which contains solids within a liquid carrier comprising:

means providing a sources of said slurry, means defining an elongated separation channel having closed top and opposite side walls, said channel being adapted to receive said slurry at one end thereof and convey the same along the length thereof, means dividing said separation channel into an initial length portion and a second length portion which is located downstream of said initial length portion whereby flow of slurry along said initial and second length portions is adjustable to different values, substantially planar foraminous means defining a lower wall of said separation channel whereby slurry contained within said channel is caused to be disposed in contact with said foraminous means, means for moving said foraminous means forwardly relative to said separation channel, means for controllably causing said slurry to flow along said initial portion of the length of said separation channel at a first flow rate, said flow rate being sufficient to establish and maintain conditions of slurry flow along said initial portion of the length of said channel such that solids contained within said slurry are maintained suspended and swept along with said flowing slurry and prevented from accumulating in, or in inhibiting flow relationship with, the foramina of said foraminous means which is disposed along said initial length portion of said separation channel, means for developing a differential pressure of a first value across said foraminous means along said initial portion of the length of said elongated channel whereby liquid is caused to flow from said slurry through said foraminous medium during the time of residence of said slurry within said initial length portion of said separation channel, means for adjusting flow of slurry along said second length portion of said separation channel to a second value which is different from said first value, and for adjusting a differential pressure across said foraminous means along said second length portion of said separation channel to a second value, said second value of said differential pressure being different than said first value of said differential pressure and, in combination with said flow of slurry along said second length portion, being sufficient to cause said solids in said slurry to be captured on that surface of said foraminous means facing said slurry in said channel to define a layer of solids on said foraminous means, and means for removing said layer of solids from said foraminous means.

2. The system of claim 1, and including means for collecting said liquid withdrawn from said slurry and means for collecting said solids removed from said foraminous means.

3. The system of claim 1, wherein the planar foraminous means comprises a foraminous filtration medium.

4. The system of claim 1, wherein the means for developing said differential pressure along said initial length portion of said separation channel at said first value comprises means for conducting the slurry into the initial length portion of said separation channel under pressure.

5. The system of claim 4 and including means for selectively applying suction forces to the underside of the planar foraminous means.

6. The system of claim 1, wherein the slurry flowing therealong said initial length portion of said separation channel is pressurized to a value greater than atmospheric pressure.

7. The system of claim 6 and further comprising orifice means for imparting turbulence to the flow of slurry, the orifice means being positioned within said enclosed separation channel and projecting into said channel in the flow path of said slurry moving within said channel.

8. The system of claim 1 and including flow restrictive means disposed within said separation channel and serving as a dividing location between said initial length of said separation channel and its first value of differential pressure and said second length portion of said separation channel and its second value of differential pressure.

9. The system of claim 1 wherein said foraminous means moves along said initial and second length portions of said separation channel at the same forward speed and the flow of slurry along said initial and second length portions of said separation channel provides for a continuous supply of slurry to said length portions and said separation of liquid and solids occurs in a continuous fashion.

* * * * *